No. 776,139. PATENTED NOV. 29, 1904.
M. L. LUEBBEN.
STOCK FOOD PACKAGE.
APPLICATION FILED APR. 16, 1903. RENEWED MAY 12, 1904.

NO MODEL.

Inventor
M. L. Luebben

No. 776,139.

Patented November 29, 1904.

UNITED STATES PATENT OFFICE.

MELCHIOR L. LUEBBEN, OF SUTTON, NEBRASKA.

STOCK-FOOD PACKAGE.

SPECIFICATION forming part of Letters Patent No. 776,139, dated November 29, 1904.

Application filed April 16, 1903. Renewed May 12, 1904. Serial No. 207,639. (No model.)

*To all whom it may concern:*

Be it known that I, MELCHIOR L. LUEBBEN, a citizen of the United States, residing at Sutton, in the county of Clay and State of Nebraska, have invented certain new and useful Improvements in Stock-Food Packages, of which the following is a specification.

This invention has relation to feed for horses and cattle, and aims to meet a long-felt want in the provision of a package comprising hay or like edible fibrous material in its natural state and grain in proper proportions, the grain being preferably crushed and pressed into the mat or web of hay, which acts as a carrier therefor. The hay after being formed into a mat and having the grain embedded or pressed therein constitutes a package which may be of any desired shape and size. In the preferable construction the hay is formed into a continuous web or mat and the grain is applied to a side thereof, the mat and grain being subjected to pressure by being passed between crushing-rolls, whereby the grain is crushed and embedded into the mat, the latter being subsequently rolled into a cylindrical bale.

Figure 1:
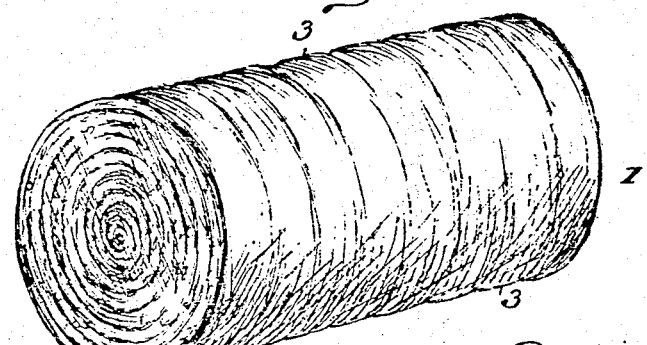
Figure 2:
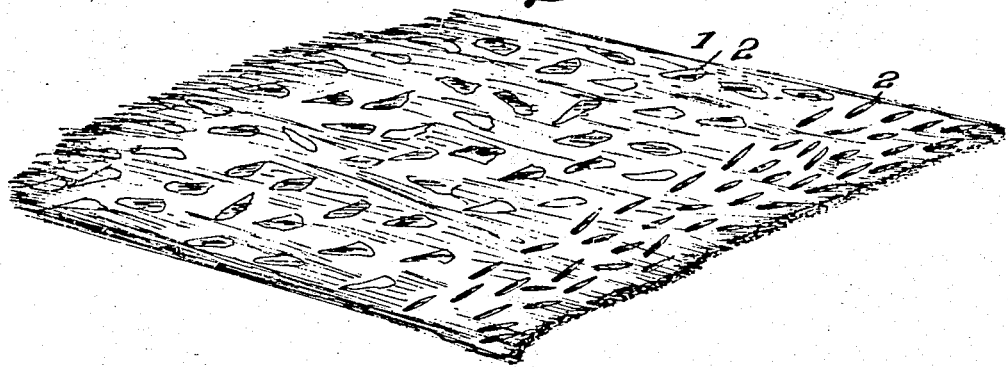
Figure 3:
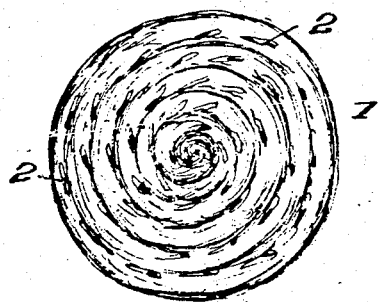

In the drawings forming a part of the specification, Figure 1 is a perspective view of a food-package embodying the invention, parts being broken away. Fig. 2 is a perspective view of the mat or web, showing grain applied to a side thereof. Fig. 3 is an end view of a portion of a package on a larger scale.

Corresponding and like parts are referred to in the following description and indicated in all the views of the drawings by the same reference characters.

The hay or edible fibrous material is formed into a mat 1 in any manner, and grain 2 is applied to a side thereof, either in the process of formation or thereafter, the mat with the grain applied thereto being subjected to pressure, preferably by being passed between crushing-rolls, to embed the grain into the mat and at the same time crush the grain. The prepared mat is given the required shape according to the outline of the package. In the preferable construction the mat is rolled upon itself, as shown in Fig. 1, portions of the same being indented or pressed into the bale for securance of the wraps, layers, or winds, as shown at 3, Fig. 1.

The grain may be corn, oats, wheat, rye, or other cereal, such as commonly fed to stock, and by being pressed into the mat gives firmness thereto, said mat serving to carry the grain, the hay and grain together occupying but very little more space, if any, than would be taken up by the hay alone, although heavier by reason of the added weight of the grain.

The term "hay" includes long feed, such as grass, alfalfa, fodder, clover, and edible fibrous material of any nature. The package may be of a size sufficient for a single ration, thereby greatly saving labor and insuring full feed and enabling tally being readily kept thereon.

Having thus described the invention, what is claimed as new is—

1. A stock-food package consisting of long edible fibrous material pressed into a mat or web, and loose kernels of grain distributed over the mat and held in the interstitial spaces thereof.

2. A stock-food package consisting of long edible fibrous material compressed to form a mat or web, and loose kernels of grain distributed over a side of the mat and pressed into the interstitial spaces thereof.

3. A stock-food package consisting of long edible fibrous material formed into a web, loose kernels of grain applied to a side of the web and distributed thereover, said web being rolled upon itself.

4. A stock-food package consisting of long edible fibrous material pressed into a mat or web, and loose kernels of grain distributed over the mat, said mat being rolled upon itself and having portions of the wraps or layers pressed into the subjacent preceding layers to bind the layers together.

In testimony whereof I affix my signature in presence of two witnesses.

MELCHIOR L. LUEBBEN. [L. S.]

Witnesses:
   THEO. MILLER,
   E. E. CULVER.